United States Patent
Shreve

(10) Patent No.: US 8,739,697 B1
(45) Date of Patent: Jun. 3, 2014

(54) HIGH PRESSURE PRESS WITH TENSIONING ASSEMBLY AND RELATED METHODS

(75) Inventor: Shelby M. Shreve, Springville, UT (US)

(73) Assignee: US Synthetic Corporation, Orem, UT (US)

( * ) Notice: Subject to any disclaimer, the term of this patent is extended or adjusted under 35 U.S.C. 154(b) by 657 days.

(21) Appl. No.: 12/916,064

(22) Filed: Oct. 29, 2010

Related U.S. Application Data

(60) Provisional application No. 61/256,209, filed on Oct. 29, 2009, provisional application No. 61/256,219, filed on Oct. 29, 2009, provisional application No. 61/256,248, filed on Oct. 29, 2009, provisional application No. 61/256,267, filed on Oct. 29, 2009.

(51) Int. Cl.
*B30B 11/00* (2006.01)

(52) U.S. Cl.
CPC .............. *B30B 11/004* (2013.01); *B30B 11/007* (2013.01)
USPC .............................. 100/232; 425/77; 425/330

(58) Field of Classification Search
USPC .................... 100/214, 232; 425/77, 193, 330, 425/DIG. 26; 419/48, 51
See application file for complete search history.

(56) References Cited

U.S. PATENT DOCUMENTS

| | | | |
|---|---|---|---|
| 2,389,818 A | 11/1945 | Rode et al. | |
| 2,790,204 A * | 4/1957 | Edwards et al. | 425/137 |
| 2,918,699 A | 12/1959 | Hall | |
| 2,941,248 A | 6/1960 | Hall | |
| 2,968,837 A | 1/1961 | Zeitlin et al. | |
| 3,093,862 A | 6/1963 | Gerard et al. | |
| 3,093,863 A | 6/1963 | Ehlert | |
| 3,159,876 A | 12/1964 | Hall | |
| 3,160,089 A * | 12/1964 | Platou | 100/214 |
| 3,182,353 A | 5/1965 | Hall | |
| 3,255,490 A | 6/1966 | Sturm | |
| 3,257,688 A | 6/1966 | Levey, Jr. | |
| 3,440,687 A | 4/1969 | Hall | |
| 3,914,078 A | 10/1975 | Kendall | |
| 3,922,127 A | 11/1975 | Schwarzkopf | |
| 4,302,168 A | 11/1981 | Khvostantsev | |
| 4,927,345 A | 5/1990 | Takei et al. | |
| 5,364,253 A | 11/1994 | Kojima et al. | |
| 5,744,170 A | 4/1998 | Hall | |
| 5,780,139 A | 7/1998 | Carter et al. | |
| 5,851,568 A | 12/1998 | Huang | |
| 6,022,206 A | 2/2000 | McNutt | |
| 6,186,763 B1 | 2/2001 | Scanlan | |
| 6,336,801 B1 | 1/2002 | Fish et al. | |
| 6,336,802 B1 | 1/2002 | Hall | |
| 7,186,104 B2 | 3/2007 | Hall et al. | |
| 7,231,766 B2 | 6/2007 | Hall et al. | |
| 7,354,262 B2 | 4/2008 | Hall et al. | |

(Continued)

FOREIGN PATENT DOCUMENTS

CN 2291198 Y 9/1998

*Primary Examiner* — Jimmy T Nguyen
(74) *Attorney, Agent, or Firm* — Holland & Hart LLP

(57) ABSTRACT

A high pressure press assembly along with related methods and components for the press assembly are provided. In one embodiment, a press assembly includes a first press base having one or more tie bar receiving holes extending therethrough. A second press base may also include one or more tie bar receiving holes extending therethrough. A tie bar extends between the first press base and the second press base. A tensioning assembly is operatively coupled to the tie bar to place the tie bar in tension.

9 Claims, 10 Drawing Sheets

(56) References Cited

U.S. PATENT DOCUMENTS

| | | |
|---|---|---|
| 7,467,936 B2 | 12/2008 | Hall et al. |
| 7,467,937 B1 | 12/2008 | Hall et al. |
| 7,481,639 B2 | 1/2009 | Hall et al. |
| 7,497,675 B2 | 3/2009 | Hall et al. |
| 7,513,764 B1 | 4/2009 | Hall et al. |
| 7,517,203 B1 | 4/2009 | Hall et al. |
| 7,540,075 B2 | 6/2009 | Sung |
| 7,540,732 B1 | 6/2009 | Hall et al. |
| 7,569,249 B2 | 8/2009 | Hall et al. |
| 7,607,876 B2 | 10/2009 | Hall et al. |
| 7,819,648 B2 | 10/2010 | Yang et al. |

\* cited by examiner

HIGH PRESSURE PRESS WITH TENSIONING ASSEMBLY AND RELATED METHODS

CROSS-REFERENCE TO RELATED APPLICATIONS

The present application claims the benefit of each of U.S. Provisional Patent Application No. 61/256,209 filed Oct. 29, 2009, U.S. Provisional Patent Application No. 61/256,219 filed Oct. 29, 2009, U.S. Provisional Patent Application No. 61/256,248 filed Oct. 29, 2009 and U.S. Provisional Patent Application No. 61/256,267 filed Oct. 29, 2009, the disclosures of each which are incorporated by reference herein in their entireties.

BACKGROUND

High pressure presses have been used for decades in the manufacture of, for example, synthetic diamond. Such presses are capable of exerting a high pressure and high temperature on a volume of carbonaceous material to reproduce the conditions that create natural diamond inside the earth. Known designs for high pressure presses include, but are not limited to, the belt press, the tetrahedral press, and the cubic press.

FIG. 1 shows a basic design for a conventional cubic press 10 known in the art. The press 10 generally includes six press bases 12, with each press base 12 aligned relative to a common central region 14. Each press base 12 includes a piston cavity 13 for receiving a piston 16, the cavities 13 being open towards the common central region 14. Cubic press 10 also includes tie bars 18 extending between each pair of adjacent press bases 12.

During operation of cubic press 10, a piston 16 is thrust out of a piston cavity 13 in each press base 12 towards common central region 14. As the pistons 16 move forward towards common central region 14, pistons 16 apply pressure to each side of a cubic volume of carbonaceous material located at common central region 14. The pressure exerted on the cubic volume of carbonaceous material at common central region 14 tends to result in counter forces acting on the various components of cubic press. Left unchecked, these counter forces can lead to component malfunction and failure such as, for example, the creation and propagation of cracks in press bases 12. Tie bars 18 are included in cubic press 10 in an attempt to stabilize cubic press 10 in the face of these counter forces.

FIGS. 2 and 3 illustrate the manner in which tie bars 18 of a known cubic press are positioned between adjacent press bases 12 (12a, 12b). With respect to FIG. 2, press bases 12 generally include a plurality of tie bar receiving holes 17. Tie bar receiving holes 17 extend from an outer surface 19 of press base 12 to a tie bar cavity 21 of press base 12. The size of tie bar receiving holes 17 is approximately equal to the size of tie bars 18 so that tie bars 18 fit snugly in tie bar receiving holes 17 when they are passed through tie bar receiving holes 17.

As shown in FIG. 3, first and second press bases 12a and 12b are positioned so that tie bar receiving hole 17a in first press base 12a is aligned with tie bar receiving hole 17b in second press base 12b. With first and second press bases 12a and 12b being aligned, tie bar 18 is passed through tie bar receiving hole 17a in first press base 12a and tie bar receiving hole 17b in second press base 12b. Tie bar 18 has a first end 18b and a second end 18a opposite first end 18b. Second end 18a has an enlarged base that is larger than the opening of tie bar receiving hole 17a, so that when tie bar 18 is positioned through both tie bar receiving holes 17a and 17b, the enlarged base of second end 18a at least partially abuts against first press base 12a. First end 18b is threaded, so that when it protrudes out of tie bar receiving hole 17b of second press base 12b, a nut 22 having threads compatible with those of first end 18b can be assembled on to first end 18b of tie bar 18.

Nut 22 may be assembled on to first end 18b of tie bar 18 until nut 22 at least partially abuts against second press base 12b. Additional tightening of nut 22 places tie bar 18 under tension, which, when combined with other tensioned tie bars 18 positioned between the remaining pairs of adjacent press bases 12, provides a measure of stability to cubic press 10. Pre-loading or pre-tensioning tie bars 18 in this manner (i.e., tensioning the tie bars 18 prior to operation of the press 10) can increase the fatigue life of tie bars 18.

Problems with the above configuration arise in that the large diameter of tie bar 18 makes tightening nut 22 about tie bar 18 extremely difficult. The torque required to tighten a nut about a bolt is may be approximated by the equation $T=(c)D^3$, where T is the torque required, c is a constant, and D is the diameter of the bolt. Accordingly, as bolt diameter increases, an exponential increase in torque is required to tighten the nut about the bolt. Because tie bars 18 used in cubic press 10 often have relatively large diameters (including tie bars with diameters of 9 inches or larger), the amount of torque required to tighten nut 22 on an associated tie bar 18 is extremely high and, in some circumstances, impossible or impractical to produce given resource limitations. When the amount of torque required to further tighten nut 22 about tie bar 18 becomes too large, the amount of tension (or pre-tension) supplied to tie bar 18 is effectively capped or limited, despite the fact that additional tensioning might increase the fatigue life of tie bars 18.

Additionally, while precise pre-tensioning of tie bars 18 is desirable, the above-described configuration often requires crude tightening techniques with little control over the amount of torque provided to nut 22. For example, a common procedure for tightening nuts about large bolts is to secure a long-armed wrench to the nut and then hit a sledge hammer against the arm of the wrench to twist the nut about the bolt. Great variations in the amount of torque supplied by each swing of the sledgehammer against the arm of the wrench results in little or no control over pre-tensioning accuracy.

Further, it has been found that threads at an end of tie bars 18 are often the location of low cycle fatigue failure. Because the above-described configuration relies upon nut the 22 tightened onto threaded tie bar 18 to pre-tension tie bar 18, tie bars 18 are susceptible to low cycle fatigue failure.

Thus, it would be advantageous to provide an improved high pressure press assembly and an improved method of assembling a high pressure press.

SUMMARY

The present disclosure relates to high pressure presses, associated components and methods. In one embodiment of the present disclosure, a high pressure press assembly implementing a tensioning assembly in the pre-loading of tie bars is described. In another embodiment of the present disclosure, a method for assembling a high pressure press comprising the use of multi jack bolt tensioners to pre-load tie bars is described.

In accordance with one embodiment, a method is provided for assembling a high pressure press. The method includes tensioning a tie bar extending between a first press base and a second press base to within 10% of a selected tensile stress value. In one particular embodiment, the method may include coupling a nut body with a first end of the tie bar adjacent the second press based. At least a portion of the nut body may then be displaced away from the second press base placing the tie bar in tension.

In another embodiment, a high pressure press assembly is provided. The press includes a first press base, a second press base and a tie bar having a first end and a second end opposite the first end. The tie bar extends between the first press base and the second press base. The Assembly further includes a tensioning assembly coupled to the first end of the tie bar, wherein the tensioning assembly is sized and configured to place the tie bar within 1,000 pounds per square inch of a selected amount of tension. In one particular embodiment, the tensioning assembly may include a multi jack bolt tensioner coupled to the first end of the tie bar.

In accordance with another embodiment, a method for assembling a high pressure press which comprises applying a load to a tie bar extending between a first press base and a second press base to approximately 1.1 times an anticipated joint-separating force.

Features from any of the embodiments described herein may be used in combination with one another, without limitation. In addition, other features and advantages of the instant disclosure will become apparent to those of ordinary skill in the art through consideration of the ensuing description, the accompanying drawings, and the appended claims.

Figure 1:
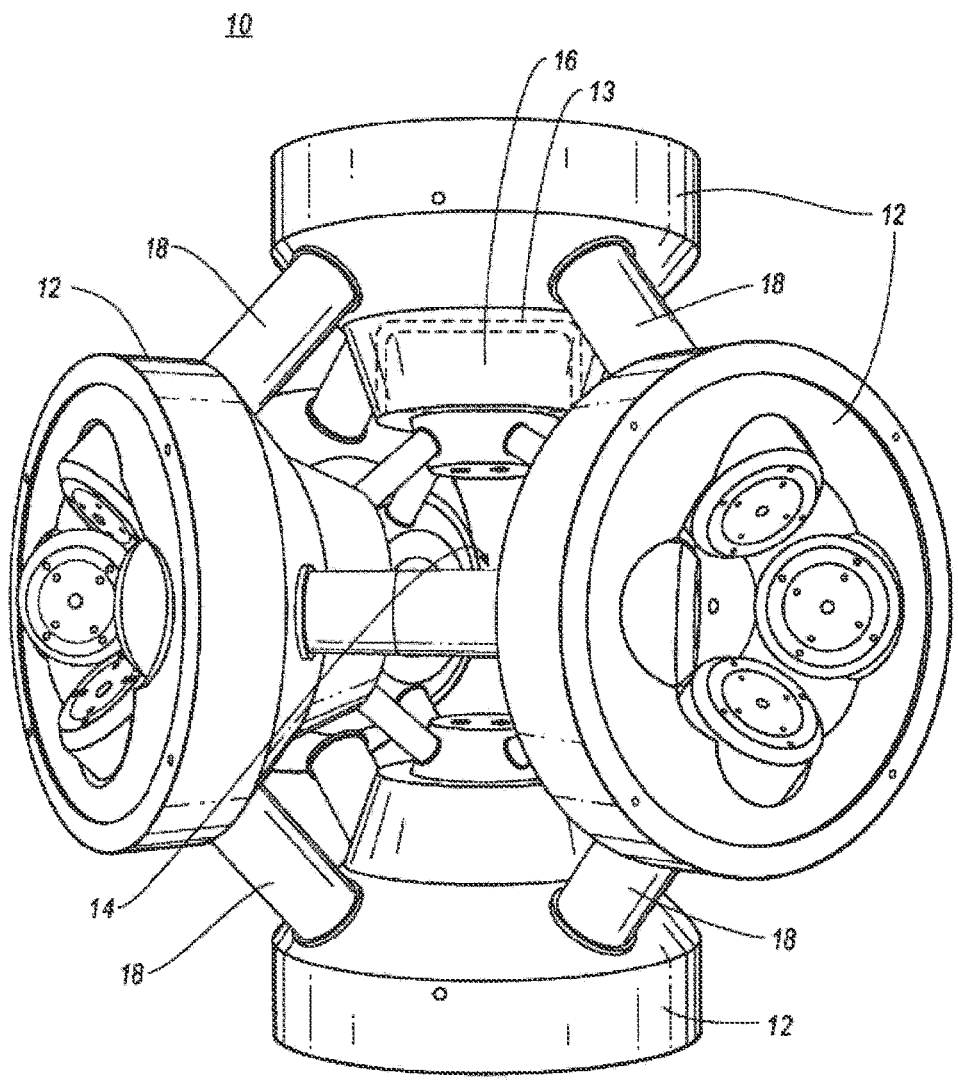
FIG. 1 shows a perspective view of a conventional cubic press known in the art.
Figure 2:
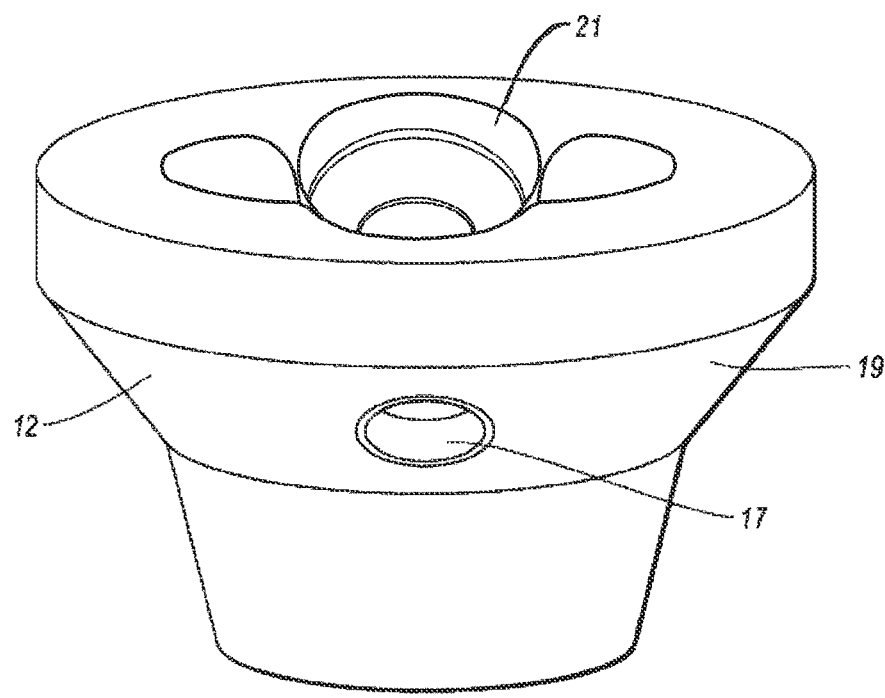
FIG. 2 shows a perspective view of a press base shown in FIG. 1.
Figure 3:
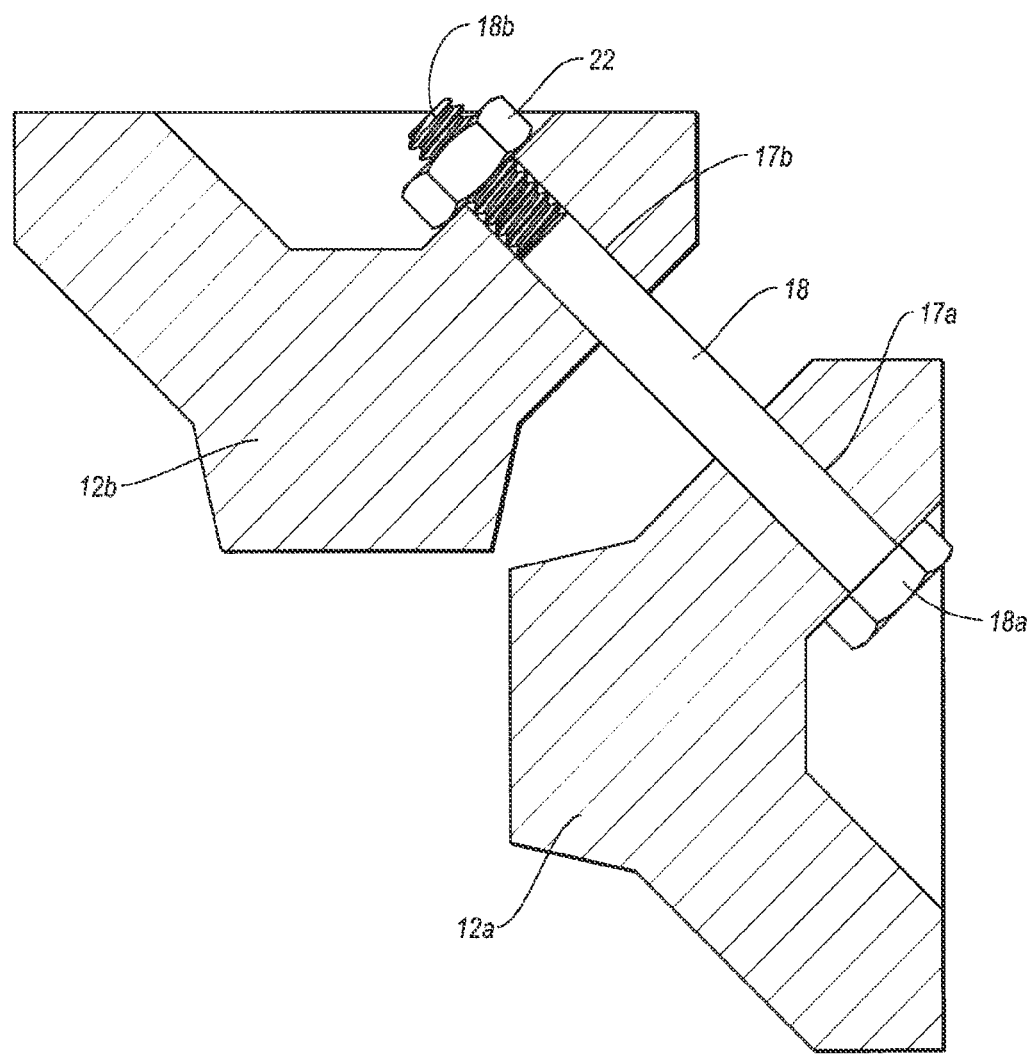
FIG. 3 shows a sectional view of a portion of the cubic press shown in FIG. 1, including two adjacent press bases having a tie bar positioned therebetween.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure relates generally to a high pressure press assembly and methods of assembling high pressure presses. For purposes of explaining the features of the embodiments described herein, a cubic high pressure press is used as an example. However, the embodiments and features described herein are not limited to cubic press configurations. For example, the features disclosed herein could also be used in a tetrahedral press.

Figure 4:
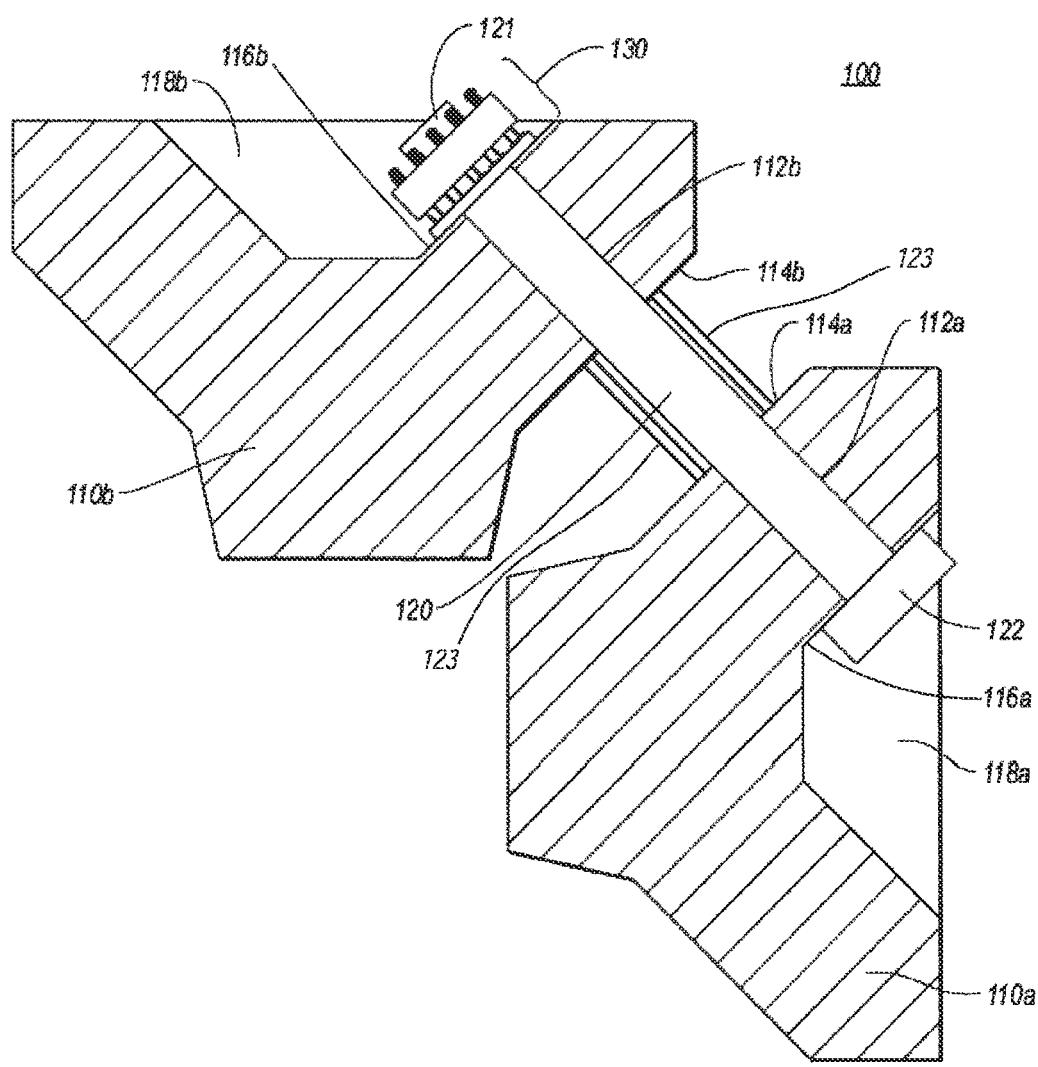
FIG. 4 shows a sectional view of a press base assembly according to an embodiment disclosed herein.

FIG. 4 shows various features of a high pressure press assembly 100. In order to more clearly show the features of high pressure press assembly 100, FIG. 4 only shows a section of high pressure press assembly 100. That is to say, only two of the six press bases (110a and 110b) of high pressure press 100 are illustrated. In application, the features shown in FIG. 4 may be applied to other adjacent press bases in high pressure press 100. Where high pressure press 100 is a cubic press, for example, twelve tie bars 120 or tie bar assemblies may be used, with one or more (and possibly all) implementing the features illustrated in FIG. 4.

FIG. 4 illustrates first press base 110a and second press base 110b. First press base 110a may be adjacent second press base 110b. Both first press base 110a and second press base 110b may comprise one or more tie bar receiving holes 112a, 112b. Tie bar receiving hole 112a may extend from a first surface 114a of first press base 110a to a second surface 116a of first press base 110a. Similarly, tie bar receiving hole 112b may extend from a first surface 114b of second press base 110b to a second surface 116b of second press base 110b. As shown in FIG. 4, second surfaces 116a, 116b may be located in tie bar cavities 118a, 118b formed in first and second press bases 110a, 110b, respectively.

As shown in FIG. 4, first press base 110a and second press base 110b located adjacent first press base 110a may be aligned relative to one another such that at least one of the tie bar receiving holes 112a of first press base 110a is aligned with at least one of tie bar receiving holes 112b of second press base 110b. In this manner, tie bar 120 may be positioned through tie bar receiving hole 112a in first press base 110a and tie bar receiving hole 112b in second press base 110b.

The material of press bases 110a, 110b is not limited and may be any suitable material for use in a high pressure press. For example, the material of press bases 110a, 110b may be a metal or metal alloy (e.g., steel). The overall size and dimensions of press bases 110a, 110b are also not limited. Similarly, the size and dimensions of various features of press bases 110a, 110b, such as tie bar receiving holes 112a, 112b and tie bar cavities 118a, 118b, are not limited. In one aspect of this embodiment, tie bar receiving holes 112a, 112b may have a diameter approximately equal to the diameter of the tie bars to be inserted therethrough.

A tie bar 120 may be positioned to extend between first press base 110a and second press base 110b. Positioning tie bar 120 between first press base 110a and second press base 110b may comprise passing a first end 121 through tie bar receiving hole 112a of first press base 110a and tie bar receiving hole 112b of second press base 110b with which this tie bar receiving hole 112a is aligned. Once positioned in this manner, first end 121 may protrude beyond a surface of second press base 110b, for example, beyond surface 116b.

A second end 122 of tie bar 120 may have an enlarged base or other abutment structure. Enlarged base of second end 122 may be sized and configured such that it does not pass through the opening of tie bar receiving hole 112a in surface 116a of first press base 110a. A surface of enlarged base of second end 122 may be positioned to abut, and may be placed substantially flush against, first press base 110a. For example, a surface of the enlarged base of second end 122 may be substantially flush with the surface of first press base 110a (or at least a portion thereof) that surrounds the opening of tie bar receiving hole 112a.

One or more spacers 123 may be positioned between the adjacent press bases 110a and 110b to help maintain spacing of the press bases 110a and 110b when the press assembly 100 is at rest, as well as when it is operational and forces are exerted between the various press bases. The spacers 123 also help to maintain a desired level of tension or tensile stress in the tie bars 120 once installed or assembled as discussed in further detail below.

High pressure press assembly may also comprise a tensioning assembly. Tensioning assembly may be coupled to one end of a tie bar to provide a selected level of tension in the tie bar. The tensioning assembly may include one or more jacking mechanisms of a hydraulic, pneumatic, mechanical or other configuration.

For example, the tensioning assembly may include a multi jack bolt tensioner (MJT) 130. In one embodiment, MJT 130 may be positioned on first end 121 of tie bar 120 adjacent a surface of second press base 110b. MJT 130 may have a generally annular shape and may be positioned on first end 121 of tie bar 120 by passing first end 121 of tie bar 120 through the center of MJT 130. In one embodiment, the inner diameter of MJT 130 may be approximately equal to the diameter of first end 121 of tie bar 120. The protruding portion of first end 121 of tie bar 120 (relative to the associated surface of the second press base 110b) may be longer, equal to, or shorter than the height of MJT 130. In this manner, first end 121 of tie bar 120 may protrude above MJT 130, be flush with MJT 130, or reside within MJT 130 when MJT 130 is positioned on first end 121 of tie bar 120.

Figure 5:
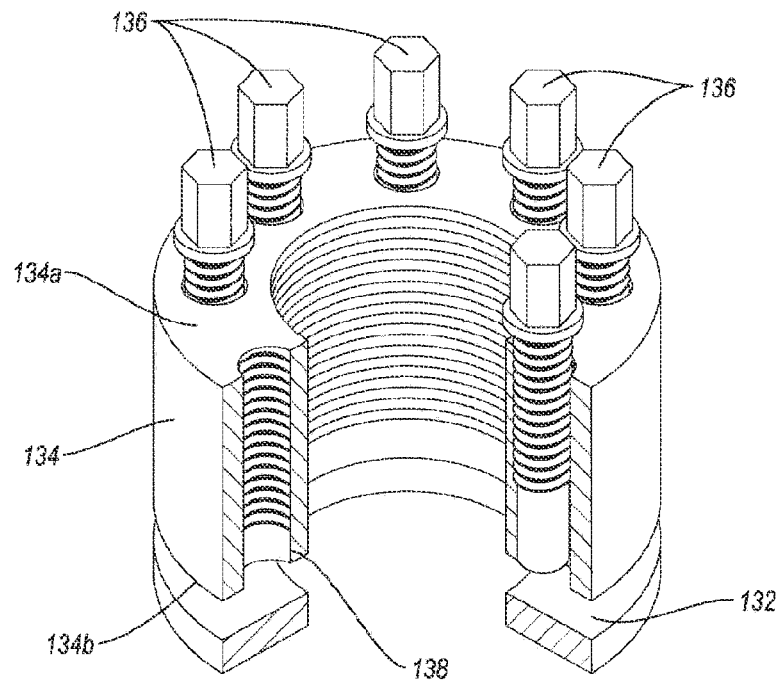
FIG. 5 shows a partially cut-away perspective view of a multi jack bolt tensioner used in the press base assembly illustrated in FIG. 4.

As shown in FIG. 5, in one embodiment MJT 130 may generally comprise a washer 132, a nut body 134, and one or more jack bolts 136 housed in or otherwise coupled with nut body 134. Both washer 132 and nut body 134 may exhibit a generally annular shape. Washer 132 and nut body 134 may have substantially similar inner diameter and outer diameters such that when nut body 134 is positioned on top of washer 132, the inner holes and outer circumferences of the washer 132 and nut body 132 may be aligned. However, the size and shapes of washer 132 and nut body 134 are not limited and they may even exhibit dissimilarities in size or shape. Further, washer 132 may be hardened (e.g., via heat treating, surface treatments, or as otherwise known in the art). In another embodiment, the nut body 134 may also be hardened. The washer 132 and nut body may be formed of various materials, without limitation, such as a metal or metal alloy (e.g., steel).

Nut body 134 may have one or more jack bolt receiving holes 138 formed therein. Jack bolt receiving holes 138 may extend from a first surface 134a to a second surface 134b opposite first surface 134a. Jack bolt receiving holes 138 may be spaced apart evenly around the circumference of nut body 134 as shown in FIG. 5, or may be spaced in an uneven pattern around the circumference of nut body 134. Jack bolt receiving holes 138 may have a diameter approximately equal to a diameter of a jack bolt 136 to be disposed therein. Jack bolt receiving holes 138 may also include threading that is compatible or complementary with threading on jack bolts 136 to be disposed therein, so that jack bolts 136 may be threadably coupled to jack bolt receiving holes 138.

As noted above, jack bolts 136 may be sized for insertion into, and for threadable coupling with, jack bolt receiving holes 138. Jack bolts 136 may have a length greater than the height of nut body 134 (i.e., greater than a distance from the first surface 134a of the nut body 134 to the second surface 134b thereof). In one embodiment, jack bolts 136 may include threading on only a portion of jack bolt 136. For example, a lower portion of jack bolt 136 may be free of threading, an upper end of jack bolt 136 may be free of threading, or both upper and lower portions may be free of threading. In other embodiments, the jack bolts 136 may be differently configured and may have a length that is substantially the same as, or less than, the height of nut body 134. In some embodiments, threads may extend the entire length of the jack bolt 136.

In yet other embodiments, other structures or mechanisms may be used instead of jack bolts. For example, hydraulic or pneumatic cylinders or other actuators may be utilized. Such actuators may be paced between a surface of an associated press base and a surface of a body coupled with the tie bar (similar to the nut body 134) and provide a desired level of force between such components.

Figure 6A:
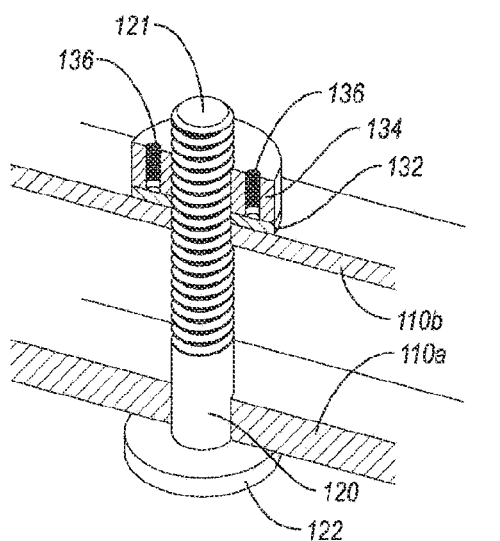
FIG. 6A shows a partially cut-away perspective view of a multi jack bolt tensioner positioned on a first end of a tie bar extending between adjacent press bases in accordance with an embodiment disclosed herein.

MJT 130 may be engaged with tie bar 120 and second press base 110b in such a manner as to place tie bar 120 under tension as it extends between first press base 110a and second press base 110b. As shown in FIG. 6A, engagement of MJT 130 may generally include passing first end 121 of tie bar 120 through the center of washer 132 and with washer 132 being positioned against second press base 110b. The first end 121 of tie bar 120 then passes through the center of nut body 134 and nut body 134 is positioned against washer 132. In positioning nut body 134, nut body 134 may be secured to tie bar 120 to prevent or limit relative displacement between nut body 134 and tie bar 120.

In other words, nut body 134 is coupled with tie bar 120 in such a way that it may not be removed from first end 121 of tie bar by simply sliding nut body 134 in the direction of a longitudinal axis of the tie bar 120. One example of securing first end 121 of tie bar 120 may include threadably connecting nut body 134 onto to first end 121 of tie bar 120. Thus, a circumferential surface of the first end 121 of tie bar 120 may include threads that are sized and configured to matingly engage threads on the inner radial wall of nut body 134. In such a configuration, nut body 134 may be screwed onto first end of tie bar 120, thereby securing nut body 134 to tie bar 120 such that longitudinal displacement of the nut body 134 relative to the tie bar is only accomplished by relative rotation of the two components. Additional examples of securing nut body 134 to tie bar 120 are discussed in further detail below.

Figure 6B:
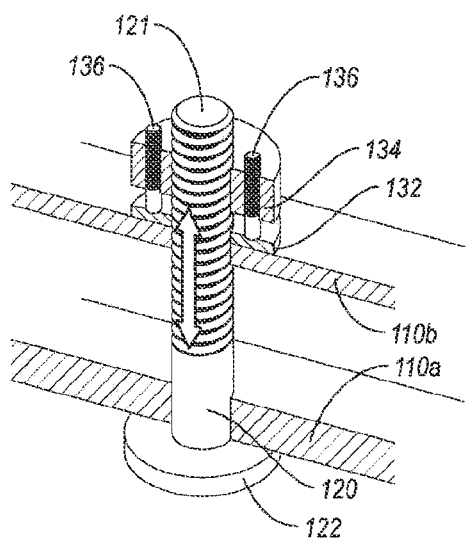
FIG. 6B shows a partially cut-away perspective view of a multi jack bolt tensioner engaged with a first end of a tie bar extending between adjacent press bases in accordance with an embodiment disclosed herein.

Jack bolts 136 may be already disposed in nut body 134 during placement of nut body 134 on tie bar 120 or may be positioned in nut body 134 after nut body 134 has been secured to tie bar 120 and is positioned against washer 132. Once nut body 134 is positioned adjacent washer 132 and jack bolts 136 are disposed in nut body 134, jack bolts 136 may be screwed into nut body 134 towards washer 132 and second press base 110b. As shown in FIG. 6B, the lower end of jack bolts 136 may eventually pass through jack bolt receiving holes 138 and begin to push against washer 132. Continued rotation of, and application of torque to, jack bolts 136 relative to nut body 134 results in nut body 134 becoming displaced away from second press base 110b.

Additionally, because nut body 134 is secured to first end 121 of tie bar 120 (e.g., such as with mating threads), movement of nut body 134 away from second press base 110b also results in first end 121 of tie bar 120 being pulled in a direction away from second press base 110b. Such movement of tie bar 120, combined with the resistance to movement due to the enlarged base of second end 122 of tie bar being abutted against first press base 110a, results in tie bar 120 being placed under tension.

Because the diameter of each jack bolt 136 is relatively small (such as compared to the diameter of an associated tie bar) there is also a reduction in the amount of torque required to tighten each individual jack bolt 136. Thus, the level of torque required to screw each jack bolt 136 so as to place tie bar 120 under a desired level of tension is substantially less than would be required, for example, to screw a large diameter nut on a tie bar as done in previously known methods and as described in the Background section above. This, in turn, leads to greater accuracy in the amount of stress introduced into the tie bar 120. Greater control over the stress in the tie bar 120 provides various advantages including greater predictability in the failure rate of various components and better control over anticipated failure modes (e.g., fatigue cracking, etc.)

Additionally, the level of preload of tie bars 120 may be increased as compared to previously known methods when using MJT 130. That is to say, whereas preloading of tie bars was limited in the past due to a large diameter nut ultimately requiring an amount of torque that was too high to allow for further tightening/tensioning, the smaller diameter of jack bolts 136 requires less torque to screw jack bolts 136 and, therefore, jack bolts 136 may be displaced further to provide greater tension in tie bars 120. In fact, pre-tensile forces of an order of magnitude greater, as compared to levels obtained using previous methods as described above in the Background section, may be achieved when using jack bolts 136. As a result of increased tension, fatigue life and resistance may be greatly increased in both tie bars 120 and press bases 110a, 110b.

For example, with current methods, less than 200,000 pounds-force ($lb_f$) preload may be applied, with embodiments of the present invention, preload of 2,000,000 $lb_f$ or greater may be applied, and even as great as 2,500,000 $lb_f$ or greater.

Another way of stating the amount of preload that may be applied to the tie bar is that it may be a multiplication of the joint-separating force. For example, if during operation of a press the press bases experience a joint-separating force of a specified magnitude $F_{JS}$, the amount of preload may be determined by multiplying that force magnitude by a desired constant. For example, in one embodiment preload may be 1.1 times the joint separating force $F_{JS}$. In other embodiments, the multiplication factor may be smaller or greater than this constant. For example, the multiplication factor may be between 1.0 and 1.2.

Figure 7A:
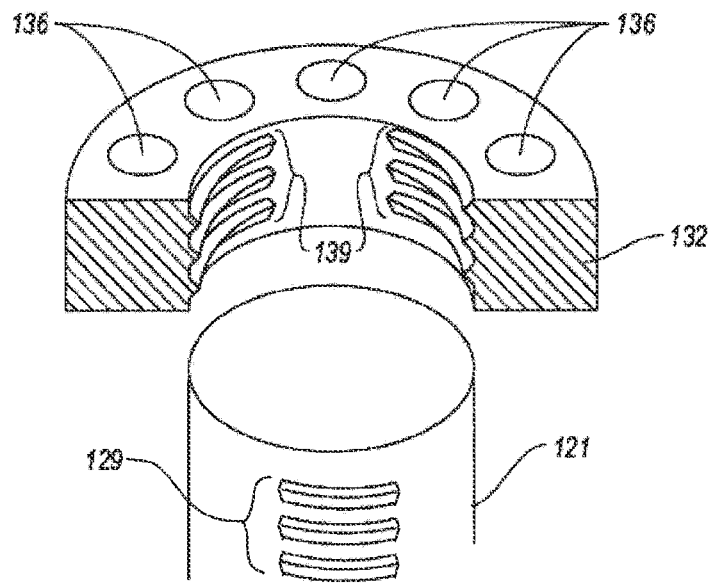
FIG. 7A shows a partially cut-away perspective view of a multi jack bolt tensioner and first end of a tie bar according to an embodiment disclosed herein.
Figure 7B:
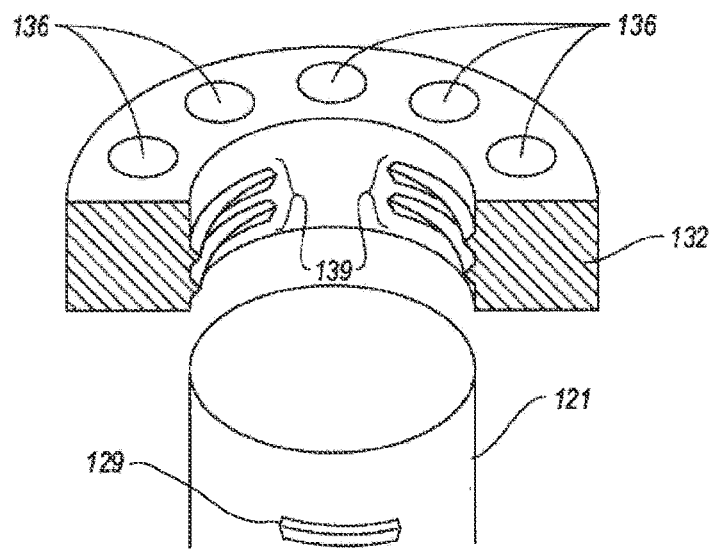
FIG. 7B shows a partially cut-away perspective view of a multi jack bolt tensioner and first end of a tie bar according to an embodiment disclosed herein.

As described above, nut body 134 may be secured to first end 121 of tie bar 120 in order to place tie bar 120 under tension when MJT 130 engages second press base 110b and tie bar 120. As also described above, securing nut body 134 to first end 121 of tie bar 120 may be achieved by providing first end 121 of tie bar 120 and the inner radial walls of nut body 134 with compatible threads. FIGS. 7A and 7B illustrate additional manners in which nut body 134 may be secured to first end 121 of tie bar 120.

Specifically, FIGS. 7A and 7B illustrate what may be referred to as breech lock designs. The breech lock designs shown in FIGS. 7A and 7B may include tie bar thread segments 129 and nut body thread segments 139. As shown in FIGS. 7A and 7B, tie bar thread segments 129 and nut body thread segments 139 are referred to as segments because they are discontinuous and do not extend around the entire circumference of tie bar 120 or nut body 134. As may be appreciated, thread segments 129 and 139 may be helically extended or may extend circumferentially along tie bar 120 and nut body 134, respectively. Tie bar 120 and nut body 134, each having thread segments 129 and 139, may mate by aligning thread segments 139 of the nut body 132 with the breaks or spaces between thread segments 129 of the tie bar 120 (and vice versa) prior to sliding nut body 134 onto tie bar 120. The nut body 132 may slide all the way down the length of first end 121 of tie bar 120 until nut body 134 abuts washer 132 without thread segments 129 and 139 interfering with each other.

When nut body 134 is in position, nut body 134 may be twisted either clockwise or counterclockwise to engage thread segments 139 of the nut body 132 with thread segments 129 of the tie bar 120. Engagement of thread segments 129 and 139 effectively locks nut body 132 relative to tie bar 120 so that nut body 132 does not slide back off of tie bar 120 or otherwise experience undesired displacement relative to the tie bar 120. Nut body 132 may only need to be twisted less than one full rotation (e.g., one quarter turn or one half turn) to engage its thread segments 139 with thread segments 129 of the tie bar 132.

The number, length, height and spacing of thread segments 129, 139 are not limited. For example, the number of threads or thread segments 129 and 139 may differ as indicated by comparing FIGS. 7A and 7B including, in some instances, a single thread or thread segment (e.g., 129 in FIG. 7B). In one embodiment, the distance between vertically adjacent individual thread segments 129 (with "vertically" being a relative term based on the orientation shown in FIGS. 7A and 7B) may be approximately equal to the thickness of individual thread segments 139. Correspondingly, the distance between vertically adjacent individual thread segments 139 may be approximately equal to the thickness of individual thread segments 129. Such configurations may ensure that a secure and tight fit is formed when nut body 134 is rotated to engage thread segments 139 with thread segments 129. However, other configurations may be utilized.

Utilizing breech lock designs may be advantageous due to the reduction in the amount of threading on tie bar 120. It has been found that threads on tie bars are often found to be a location for low cycle fatigue failure. Thus, breech lock designs reduce the possibility of low cycle fatigue failure by minimizing threads on tie bar 120. Furthermore, breech lock design are typically very robust and easy to install. Breech locks do not require as tight of tolerances for assembly and may be designed in a manner which is very robust to static overload or low cycle fatigue failure.

In yet other embodiments, a tensioning assembly may be coupled with an end of a tie bar in other manners. For example, traditional threads may be used (as compared to thread segments discussed above) to provide an initial fit of the tensioning assembly (e.g. a MJT) with a tie bar. In other embodiments, a locking pin may be used to coupled the components with one another. In yet another embodiment, a cam mechanism may be used to effect engagement of the tensioning assembly with the tie bar. Other embodiments may include locking washers, locking rings or other similar mechanisms. Such engagement mechanisms and structures are merely provided as examples, and are not to be considered limiting.

Figure 8A:
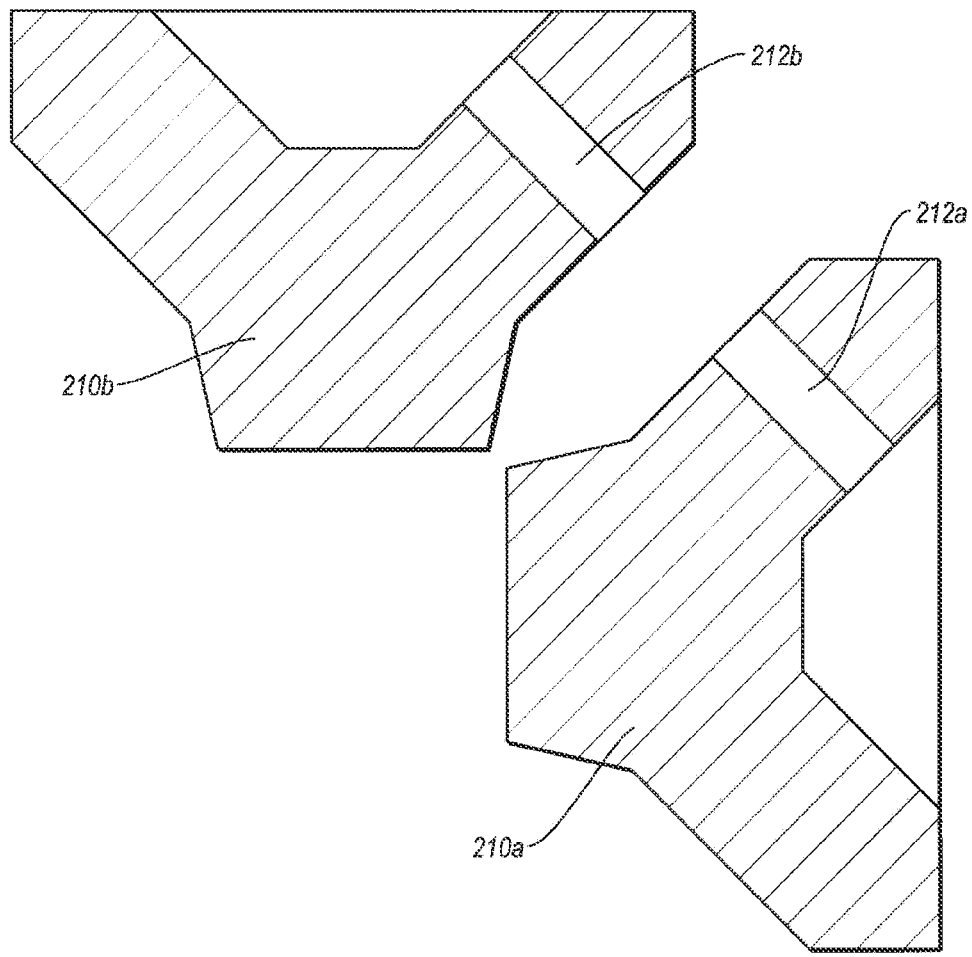
FIG. 8A shows a sectional view of a portion of a high pressure press during a first step of assembling a high pressure press according to an embodiment disclosed herein.

Referring now to FIGS. 8A-8D, a method for assembling a high pressure press is disclosed. As shown in FIG. 8A, a method for assembling a high pressure press may begin by positioning adjacent press bases 210a and 210b in accordance with the structure of the high pressure press being assembled. The positioning of press bases 210a, 210b shown in FIG. 8A may be for the assembly of a cubic press or some other desired press structure. Press bases 210a and 210b may be positioned and oriented with respect to one another such that tie bar receiving holes 212a and 212b are aligned. In this manner, a tie bar 220 (see FIG. 8B), such as has been described above, may be passed through tie bar receiving hole 212a in first press base 210a and will line up with tie bar receiving hole 212b in second press base 210b and then extend into and through tie bar receiving hole 112b in second press base 110b.

Figure 8B:
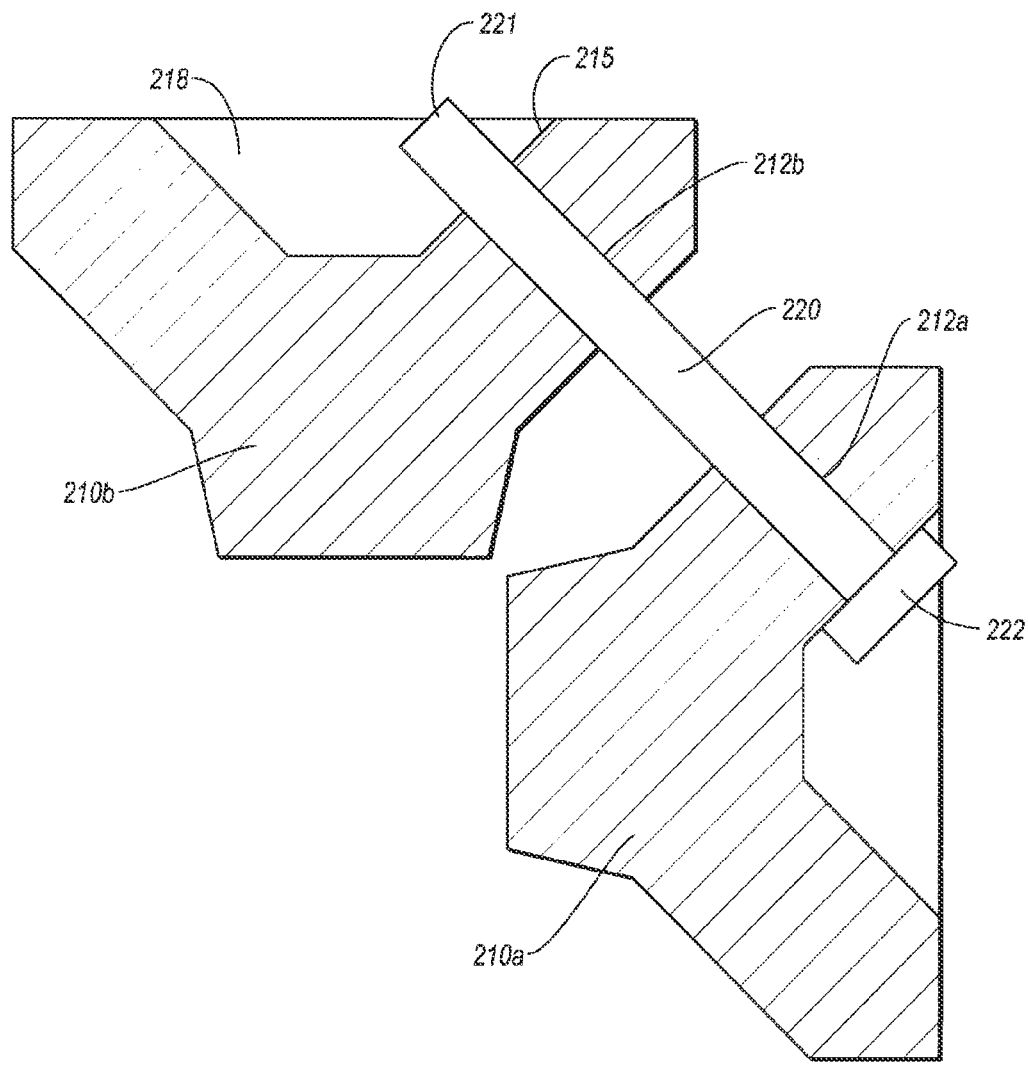
FIG. 8B shows a sectional view of a portion of a high pressure press during a second step of assembling a high pressure press according to an embodiment disclosed herein.

Thus, as shown in FIG. 8B, a tie bar 220 having a first end 221 may be passed through tie bar receiving hole 212a in press base 210a and then through tie bar receiving hole 212b in press base 210b adjacent press base 210a. Tie bar 220 maybe positioned so that first end 221 protrudes above a surface 215 of press base 210b such as the surface of a tie bar cavity 218 formed in press base 210b.

Tie bar 220 may also have a second end 222 opposite first end 221. Second end 222 may have an enlarged base or other abutment surface such as shown in FIG. 8B. The base or abutment surface of second end 222 may be may be configured, relative to the tie bar opening 212a of first press base 210b, so as to prevent tie bar 220 from passing completely through tie bar opening 212a.

Figure 8C:
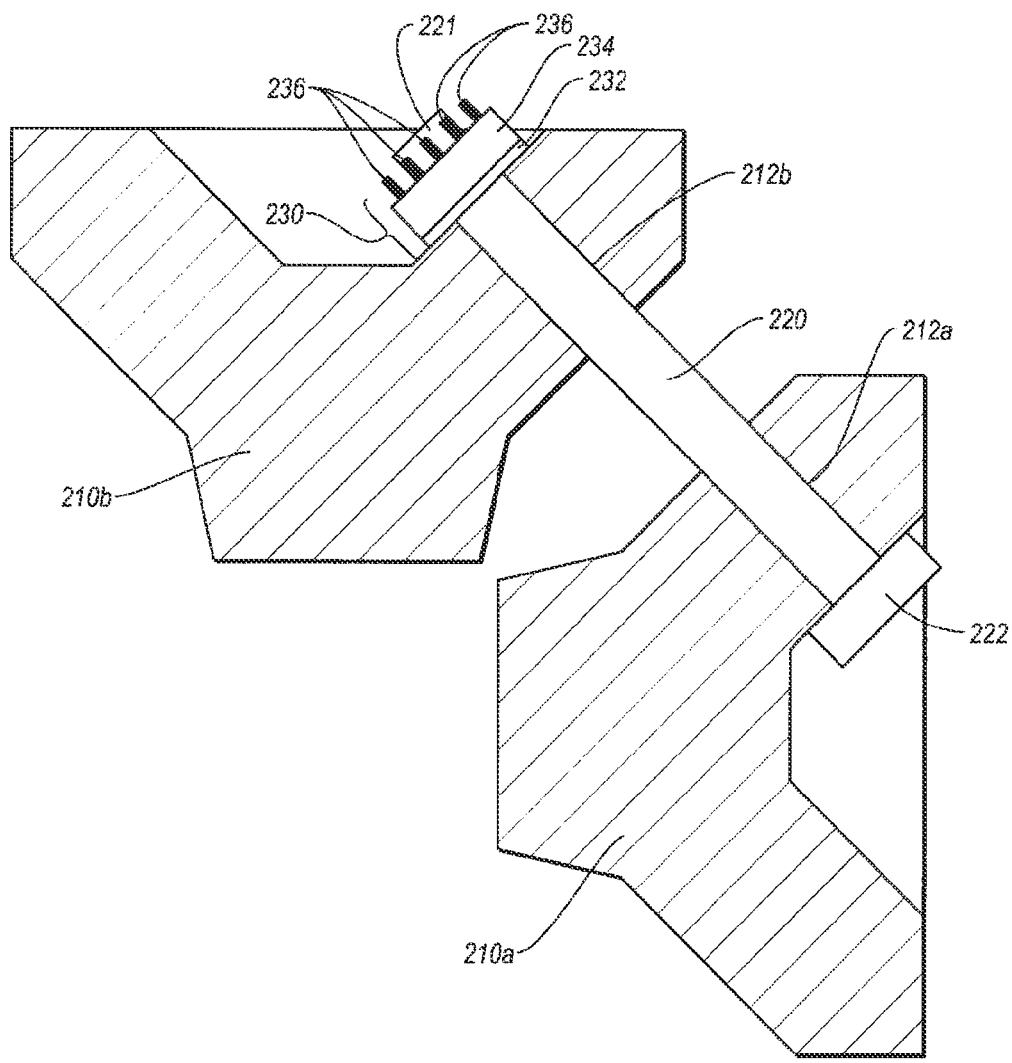
FIG. 8C shows a sectional view of a portion of a high pressure press during a third step of assembling a high pressure press according to an embodiment disclosed herein.

Once tie bar 220 is positioned as described above, a multi jack bolt tensioner (MJT) 230 may be positioned on first end 221 of tie bar 220 as shown in FIG. 8C. In one embodiment, MJT 230 may generally comprise a washer 232, a nut body 234, and one or more jack bolts 236 housed in nut body 234. For example, MJT 230 may be similar or identical to MJT 130 described in the previous embodiment and as illustrated in FIG. 5.

Positioning of MJT 230 on first end 221 of tie bar 220 may begin by positioning washer 232 on first end 221 of tie bar 220. Washer 232 may have an annular shape, and therefore positioning of washer 232 on first end 221 of tie bar 220 may generally comprise sliding washer 232 down over first end 221 of tie bar 220. Washer 232 may be slid down first end 221 of tie bar 220 until Washer 232 is flush with or generally abuts second press base 210b. It is noted that, in some embodiments, if the press base 212b exhibits a substantially surface, washer 232 may not necessarily be utilized. Rather, nut body 234 may be positioned as described next, with the exception that it abuts the press base 212b rather than abutting washer 232.

After washer 232 has been positioned, nut body 234 may be positioned on first end 221 of tie bar 220. In one aspect of this embodiment, first end 221 of tie bar 220 may comprise threads that are compatible with threads on the inner radial wall of nut body 234. In this aspect, nut body 234 may be threaded on to first end 221 of tie bar 220. Nut body 234 may be screwed down the length of first end 221 of tie bar 220 until nut body 234 abuts washer 232 or is within a desired distance of the washer 232.

The use of threads to position nut body 234 on first end 221 of tie bar 220 as described in the preceding paragraph may also secure nut body 234 to tie bar 220 as described in greater detail above. Nut body 234 may also be secured to tie bar 220 by breech lock threads (such as described above) or by some other structure that effectively couples the nut body 234 with the tie bar 220 to prevent or at least limit relative movement therebetween. Where tie bar 220 and nut body 234 each comprise compatible breech lock threads, nut body 234 may be positioned on tie bar 220 by engaging breech lock threads of nut body 234 with the breech lock threads on first end 221 of tie bar 220 to create a breech lock between nut body 234 and tie bar 220. Due to the design of breech locks, such as described above, forming of a breech lock between nut body 234 and tie bar 220 may require less than one full rotation of nut body 234 relative to tie bar 220.

Figure 8D:
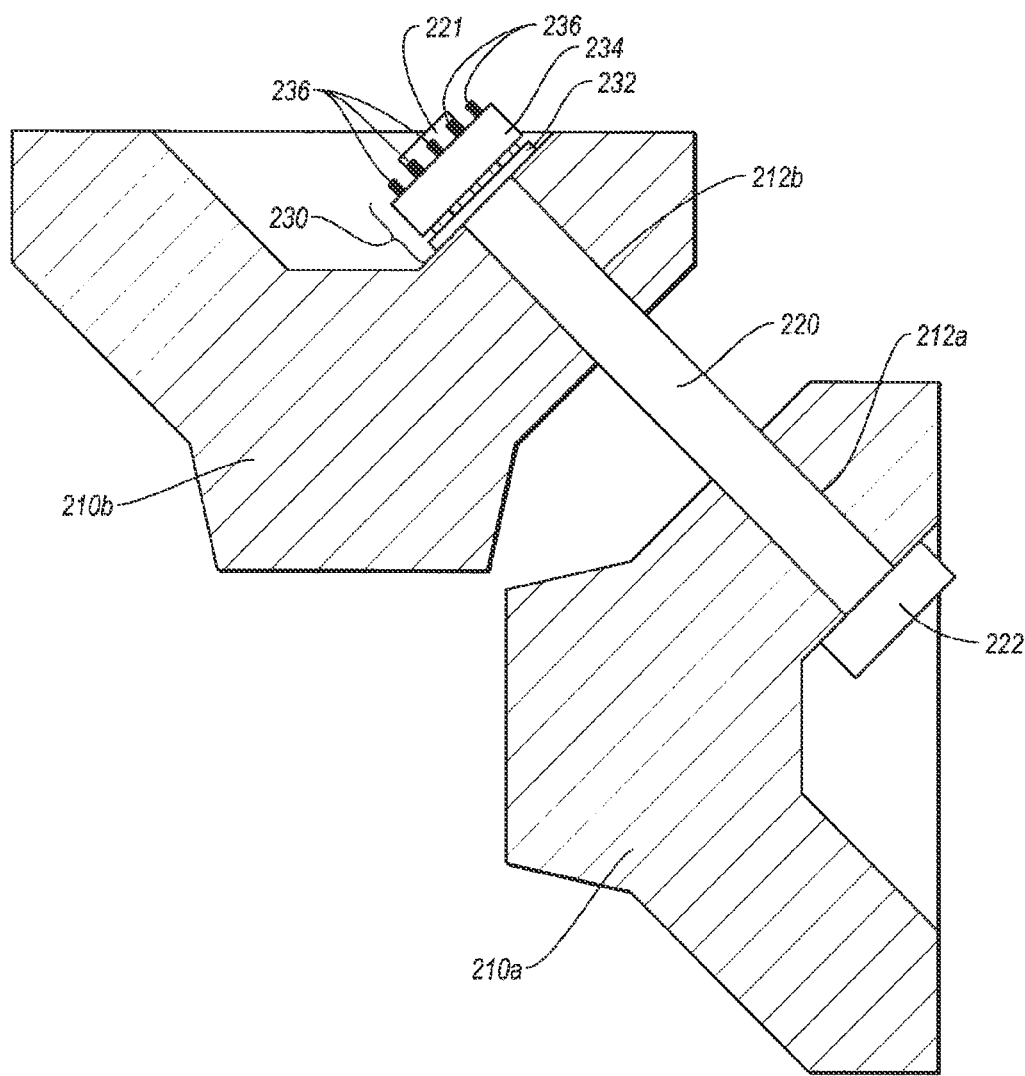
FIG. 8D shows a sectional view of a portion of a high pressure press during a fourth step of assembling a high pressure press according to an embodiment disclosed herein.

After MJT 230 has been positioned on tie bar 220 as described above, torque may be applied to each of jack bolts 236 housed in nut body 234, resulting in MJT 230 engaging with press base 210b (via washer 234) and tie bar 220 as shown in FIG. 8D. As described in greater detail above, applying torque to jack bolts 236 may cause nut body 234 to become displaced away from press base 210b. Because nut body 234 may be secured to tie bar 220 and because the base or abutment portion of second end 222 may be positioned against press base 210a, movement of nut body 234 away from press base 210b may place tie bar 220 in a tensile state by effectively applying a force to tie bar 220 that extends between press bases 210a and 210b. An equal amount of torque may be applied to each jack bolt 236, or different amounts of torque may be applied to each jack bolt 236. Furthermore, torque may be applied to jack bolts 236 in a predetermined order or pattern.

Ultimately, the torque required to screw jack bolts 236 into nut body and tension tie bar 220 may be significantly reduced as compared to the amount of torque required using previously known methods for tensioning tie bars. Furthermore, the amount of tension applied to tie bars using the above method may be greater than that which is achievable using previously known methods.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A high pressure press assembly, comprising:
   a first press base having a tie bar receiving hole extending therethrough;
   a second press base having a tie bar receiving hole extending therethrough;
   a tie bar having a first end and a second end opposite the first end, wherein the tie bar extends between the first press base and the second press base; and
   a tensioning assembly comprising a multi-jack bolts tensioner coupled to the first end of the tie bar, wherein the tensioning assembly is sized and configured to place the tie bar within 1,000 pounds per square inch of a selected amount of tension.

2. The high pressure press assembly of claim 1, wherein the multi-jack bolt tensioner includes a nut body and one or more jack bolts housed in the nut body.

3. The high pressure press assembly of claim 2, further comprising a washer disposed between the nut body and the second press base.

4. The high pressure press assembly of claim 3, wherein the one or more jack bolts are positioned and configured to press against the washer.

5. The high pressure press assembly of claim 2, wherein the first end of the tie bar comprises threads and the nut body comprises threads compatible with the threads of the first end of the tie bar.

6. The high pressure press assembly of claim 2, wherein the nut body and the first end of the tie bar are configured to effect a breech lock therebetween.

7. The high pressure press assembly of claim 6, wherein the breech lock is effected through rotational engagement of one or more thread segments on the nut body with one or more thread segments on the first end of the tie bar.

8. The high pressure press assembly of claim 7, wherein the one or more thread segments of the nut body and the one or more thread segments of the first end of the tie bar are sized and configured to engage or disengage by relative rotation of the nut body and the tie bar of a magnitude less than 360°.

9. The high pressure press assembly of claim 1, wherein the second press base comprises a tie bar cavity and wherein the first end of the tie bar protrudes into the tie bar cavity.

\* \* \* \* \*